United States Patent [19]
Knudson

[11] Patent Number: 5,009,475
[45] Date of Patent: Apr. 23, 1991

[54] IMAGE TRANSFER DEVICE AND METHOD OF MANUFACTURE

[75] Inventor: Steven B. Knudson, Golden, Colo.

[73] Assignee: Advance Display Technologies, Inc., Golden, Colo.

[21] Appl. No.: 457,269

[22] Filed: Dec. 27, 1989

[51] Int. Cl.$^5$ .............................................. G02B 6/00
[52] U.S. Cl. .................................. 350/96.10; 40/547; 350/96.25; 350/96.28
[58] Field of Search ............... 350/96.10, 96.12, 96.24, 350/96.25, 96.27, 96.28; 40/547

[56] References Cited

U.S. PATENT DOCUMENTS

| | | | |
|---|---|---|---|
| 3,503,666 | 3/1970 | Moore et al. | 350/96.24 |
| 4,650,280 | 3/1987 | Sedlmayr | 350/96.27 |
| 4,778,989 | 10/1988 | Hagemayer et al. | 350/96.10 X |

*Primary Examiner*—John D. Lee
*Attorney, Agent, or Firm*—David H. Judson

[57] ABSTRACT

An improved image transfer device for transferring light images or the like is formed using "in-situ" optical waveguides or transfer elements rather than discrete optical fibers. In one embodiment, at least first and second tapered modular spacers are formed with grooves etched therein extending between first and second end surfaces thereof. Each of the grooves has a raised lip structure which enables the spacers to be interconnected in a rigid confronting relationship to produce a plurality of closed tapered channels. Each of the channels is then filled with a conductor to form an optical waveguide for transferring an elemental portion of an image between the first and second end surfaces.

8 Claims, 3 Drawing Sheets

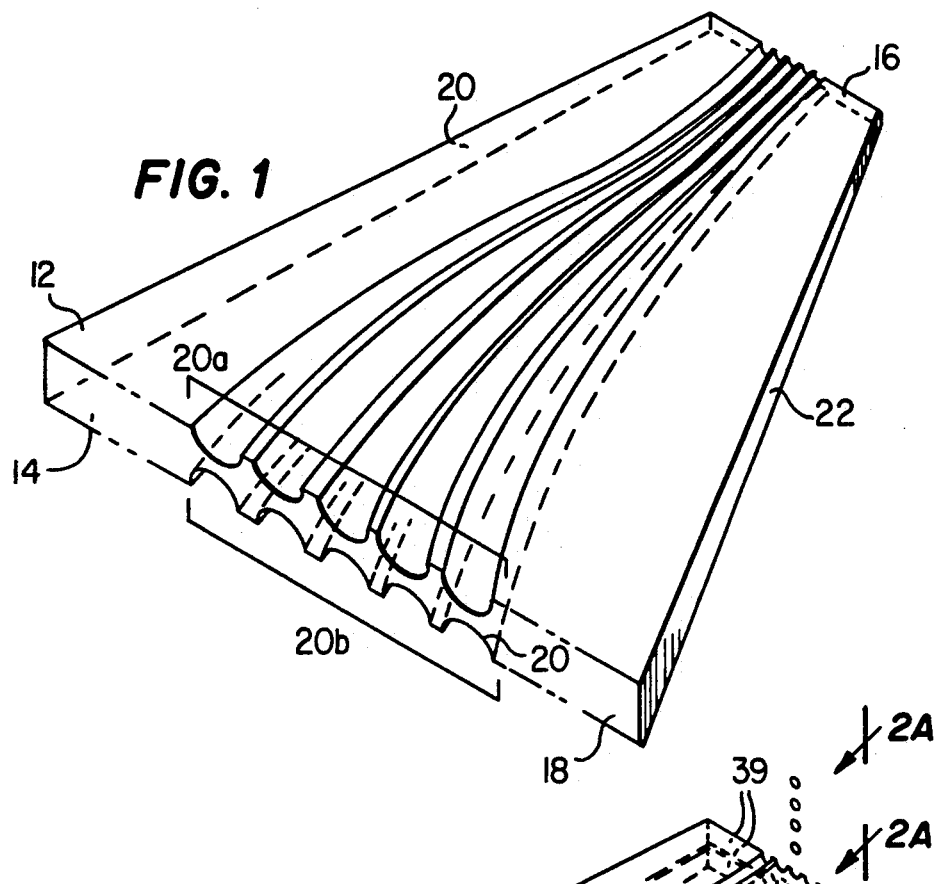

IMAGE TRANSFER DEVICE AND METHOD OF MANUFACTURE

TECHNICAL FIELD

The present invention relates generally to an image transfer device having formed-in-place "waveguide" transfer elements and methods of manufacture of such devices.

BACKGROUND OF THE INVENTION

As is well known in the prior art, image projection systems focus signal information to selected regions of a display screen to produce images. For example, in a conventional cathode ray tube ("CRT"), a beam emitted from an electron gun is directed to a small cross section on a luminescent screen and is varied in position and intensity to produce a visible pattern. As the size of the display screen increases, however, it becomes more and more difficult to accurately focus the electron beam to a specific area of the screen because of the increased size and volume of the CRT associated with the larger screen. To overcome this problem, it is also known to attach a so-called image transfer device to the display screen to magnify the screen image, thereby obviating an increase in the CRT dimensions. Typically, the transfer device comprises a plurality of optical fibers assembled into a bundle such that an image at a first or input end thereof (i.e., the image on the display screen) can be projected there through, for viewing, at a second or output end thereof. One such light transfer device is shown in U.S. Pat. No. 3,043,910 to Hicks, Jr. The display portion of the Hicks, Jr. device is manufactured by stacking a plurality of discrete fiber optic ribbons in spacer strips at a predetermined angular relationship and then cutting the strips along a bias thereof.

Fiber optic image transfer devices of the type described in the Hicks, Jr. patent have certain limitations that have prevented their widespread use for large screen display applications. The most significant operational problem in such devices is the tendency of each fiber optic ribbon to "skew" or twist with respect to the other ribbons, thereby causing the image displayed at the second end of the device to have severe vertical discontinuities. U.S. Pat. No. 4,650,280, to Sedlmayr, issued Mar. 17, 1987, and assigned to Advance Display Technologies, Inc., describes a unique image transfer device and manufacturing technique therefor for overcoming this problem through rigid alignment of the fiber optic ribbons in spacers in three mutually perpendicular planes at both ends of the device. A display device manufactured in accordance with the teachings of U.S. Pat. No. 4,650,280 transfers an aesthetically-pleasing image between the input and output of the device with high resolution.

Despite the significant operational improvements in fiber optic image transfer devices provided by the teachings in the Sedlmayr patent, it remains desirable to produce such devices without the use of discrete optical fibers. One such device is shown in U.S. Pat. Nos. 3,391,969 and 3,498,864 to Ogle which describe a fiber optic article and method of manufacture wherein planar fiber optical sheets are formed with elongated grooves filled with light transmitting material. The optical sheets are joined together with the grooves in confronting relation to form a fiber optical array. Although the Ogle manufacturing technique obviates the use of discrete optical fibers, the resulting fiber optic device does not adequately transfer an image between the input and output ends thereof. This is because each planar fiber optical sheet formed in the Ogle manufacturing technique has the same thickness between the input and output ends of the device. When the optical sheets are joined together to form a fiber optical array, there are discrete areas on the input end of the device which contact elemental portions of the image to be transferred but which have no corresponding display areas on the output end of the device. Therefore, information in the image is lost as the image is transferred between the input and output ends of the device.

There is therefore a need for an improved image transfer device which overcomes these and other limitations associated with the prior art.

BRIEF SUMMARY OF THE INVENTION

According to the present invention, the spacers normally used in a fiber optic image transfer device are modified to incorporate "formed-in-place" optical transfer elements as opposed to discrete optical fibers.

An improved image transfer device is provided comprising a plurality of discrete modular spacers each having such formed in-place signal transfer elements instead. Each transfer element or "waveguide" functions to direct an elemental portion of an image applied to the input end of the device to a predetermined location on the output end of the device. The ability to precisely direct each elemental image portion to a distinct location produces a high resolution image on the output end of the device.

In the preferred embodiment, transfer elements are formed as longitudinal channels in tapered modular spacers. Preferably, such channels are formed by etching semi-circular grooves in one or more surfaces of a plurality of discrete modular spacers and then interconnecting pairs of spacers in a confronting relationship. Alternatively, each channel is formed by supporting a pattern of elongated fiber-like elements in a deformable plastic spacer of low index of refraction material in a manner such that the elements are spaced apart throughout their length and are closer together at a first side of the plastic spacer than at a second side of the plastic spacer and wherein each element has a tapered cross-section that increases from the first side to the second side. Thereafter, the deformable plastic spacer is molded into a unitary structural assembly embodying the pattern but wherein the fiber-like elements remain removable from the molded plastic spacer. The fiber-like elements are then removed from the molded plastic spacer to create a pattern of tapered grooves therein. These steps are then repeated to create additional spacers that are then interconnecting to form the longitudinal channels in the device.

One image transfer device of the present invention comprises at least first and second modular spacers each having first and second opposed longitudinal surfaces, first and second opposed end surfaces, and first and second opposed side surfaces. The first and second longitudinal surfaces of each spacer are provided with a plurality of elongated tapered grooves therein being in substantially abutting relation along the first end surface and laterally displaced from one another and terminating along the second end surface. The first and second modular spacers are interconnected in a confronting relationship such that corresponding grooves thereof cooperate to form a plurality of closed tapered channels through the interconnected spacers. Each of the closed channels preferably includes a conductor for transferring an elemental image portion of an image through the device. By joining a plurality of tapered modular spacers to form the device, the plurality of closed tapered channels are closely spaced with respect to each other along the first end surface to thereby prevent loss of information from the image during transfer.

In yet another embodiment of the invention, the modular spacers of a first transfer device are not tapered to bring the closed channels together along the input end of the device. In this embodiment, a second transfer device is connected in parallel to the first transfer device to ensure that little or no information is lost as the image is transferred through the device.

According to another aspect of the invention, a method for forming an optical display apparatus begins by supporting a pattern of elongated fiber-like elements in a deformable plastic body of low index of refraction material in a manner such that the elements are spaced apart throughout their length and are closer together at a first side of the plastic body than at a second side of the plastic body and wherein each element has a tapered cross-section that increases from the first side to the second side. Thereafter, the deformable plastic body is molded into a unitary structural assembly embodying the pattern but wherein the fiber-like elements remain removable from the molded plastic body. After suitable curing, the fiber-like elements are removed from the molded plastic body to create a pattern of tapered grooves therein. According to the preferred method, light conducting material of a higher index of refraction than said body material is then introduced into the tapered grooves to thereby form the optical display apparatus.

BRIEF DESCRIPTION OF THE DRAWINGS

For a more complete understanding of the present invention and the advantages thereof, reference is now made to the following Description taken in conjunction with the accompanying drawings in which:

FIG. 1 is a perspective view of a first type of tapered modular spacer according to the present invention having a plurality of grooves etched or molded therein;

FIG. 2 is a perspective view of an image transfer device of the present invention comprising a plurality of discrete tapered modular spacers of the type shown in FIG. 1 interconnected to form a plurality of "passive" transfer elements;

DETAILED DESCRIPTION

Figure 3:
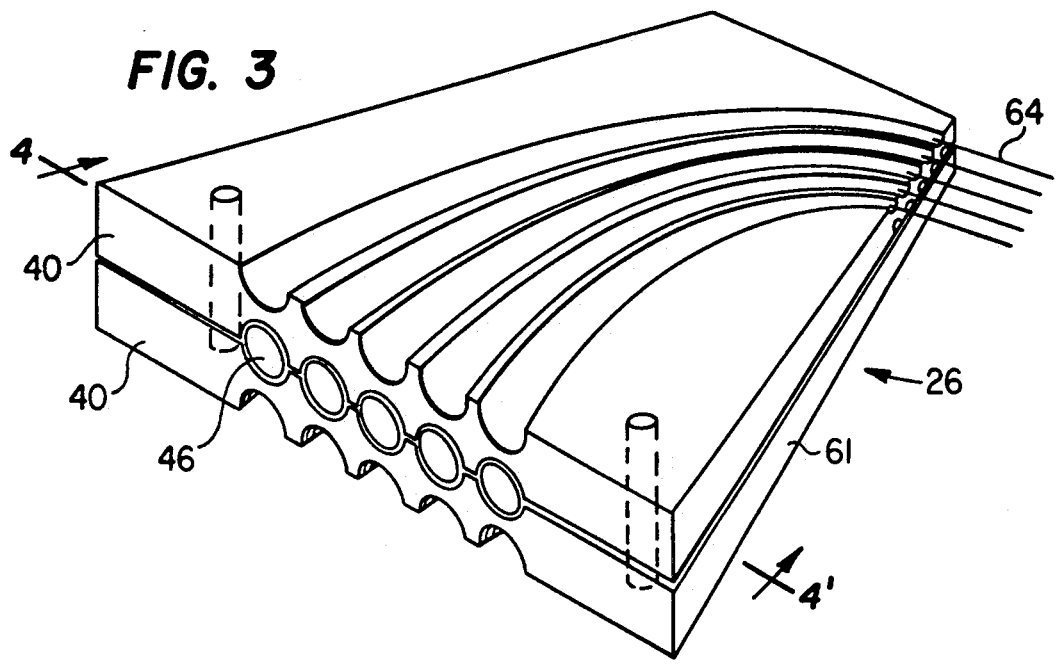
FIG. 3 is a perspective view of an alternate embodiment of the image transfer device of FIG. 2 wherein each of the transfer elements is "active"

Prior art image transfer devices have been made using discrete optical fibers supported in spacers. a plurality of optical planar sheets joined together in confronting relation to form a fiber optical array of closed channels between input and output ends of the device. One such device is shown in U.S. Pat. No. 3,391,969 to Ogle. Image transfer devices such as described in the Ogle patent have not been commercially exploited because they do not adequately transfer all information in the image between the ends of the device. This is due primarily to the fact that the input ends of the closed channels are not placed in abutting relation when the planar optical sheets are joined together. The present invention overcomes this and other problems associated with such prior art image transfer devices by one of several techniques. In one embodiment, the image transfer device is formed by using a plurality of tapered modular spacers to insure that the input ends of the closed channels are in abutting relation when the spacers are interconnected. In another embodiment, the modular spacers of the transfer device are not tapered, but a second image transfer device is connected thereto to draw the input ends of the closed channels into abutting relation. In a further embodiment, the transfer device is formed as an integral (one-piece) structure rather than by stacking modular spacers.

With reference now to the drawings wherein like reference numerals designate like or similar parts throughout the several views, FIG. 1 is a perspective view of a tapered modular spacer 10 for use in forming a first type of image transfer device according to the invention. Modular spacer 10 comprises first and second opposed longitudinal surfaces 12 and 14, first and second opposed end surfaces 16 and 18, and first and second opposed side surfaces 20 and 22. The first and second opposed longitudinal surfaces 12 and 14 preferably include sets 20a and 20b, respectively, of substantially semi-circular grooves 20 etched or otherwise formed therein. The shape of each groove 20 shown in FIG. 1 is not meant to be limiting, as each of the grooves may alternatively be triangular, elliptical or rectangular in shape. Each groove 20 extends from the first end surface 16 of the spacer 10 to the second end surface 18 thereof. As seen in FIG. 1, end portions of the grooves 20 are in substantially abutting relation along the first end surface 16, but are laterally displaced from one another along the second end surface 18. Preferably, the width or depth of each groove 20 increases along its length between the first end surface 16 and the second end surface 18 such that images transferred between the first and second end surfaces are magnified and images transferred between the second and first end surfaces are reduced. Although not shown in detail in FIG. 1, the grooves 20 may extend from the first or second side surfaces 20 or 22 (instead of the first end surface 16) to the second end surface 18.

As also seen in FIG. 1, the modular spacer 10 is preferably "tapered" in one or more dimensions for the purposes to be described. As used herein, "taper" refers to a gradual increase or decrease in the thickness or width, as the case may be, of the modular spacer 10. Preferably, the second end surface 18 has a predetermined thickness and width which is greater than the thickness and width, respectively, of the first end surface 16.

Referring now to FIG. 2, a perspective view is shown of a portion of an improved image transfer device 26 having a plurality of parallel tapered modular spacers 28a, 28b . . . of the type shown in FIG. 1 arranged to form a plurality of closed channels. Preferably, each of the spacers 28a, 28b . . . includes a set of grooves 30a etched in the first longitudinal surface 32 thereof and the set of grooves 30b etched in the second longitudinal surface 34 thereof as described above with respect to FIG. 1. In the preferred embodiment of FIG. 2, at least first and second spacers, such as spacers 28a and 28b, are arranged in a confronting relationship to form a plurality of substantially circular or elliptical closed tapered channels 36 through the interconnected tapered spacers. Each of the channels 36 has an opening 38 along the second end surface 40, and the shape of each opening 36 depends on the shape of the grooves 30 in each modular spacer 28. The geometry shown in FIG. 2 is for exemplary purposes and is not to be taken by way of limitation. Each pair of cooperating modular spacers 28 is preferably joined by a suitable mechanical interconnection to insure proper alignment of the channels 36 and to prevent cross-talk (i.e., seepage of light between channels), as will be described below.

After the spacers are interconnected, a light transmitting or conducting material 42 (e.g., plastic or glass) is flowed in to fill the closed tapered channels 36. The conducting material 42 has an index of refraction significantly different (i.e., greater) than the index of refraction of the material forming the spacer 28. The resulting "passive" transfer element comprises the material 42 (i.e., the waveguide "core") and the surrounding tapered channel 36 (i.e., the waveguide "cladding"). Alternatively, the material 42 flowed into the channels 36 is light reflective and is used to merely coat an inner peripheral surface of each closed channel 36, thereby leaving each channel 36 substantially "hollow." In this latter case, each transfer element transmits light through an air "core", and the closed channel 36 again forms the waveguide cladding. The plurality of waveguides or transfer elements produced in this fashion function to transfer images between the first and second end surfaces 39 and 40 of the device 26.

Instead of "etching" the tapered grooves directly as described above, each closed tapered channel in the device is formed by supporting a pattern of elongated fiber-like elements in a deformable plastic spacer of low index of refraction material in a manner such that the elements are spaced apart throughout their length and are closer together at a first side of the plastic spacer than at a second side of the plastic spacer and wherein each element has a tapered cross-section that increases from the first side to the second side. Thereafter, the deformable plastic spacer is molded into a unitary structural assembly embodying the pattern but wherein the fiber-like elements remain removable from the molded plastic spacer. The fiber-like elements are then removed from the molded plastic spacer to create a pattern of tapered grooves therein. These steps are then repeated to create additional spacers that are then interconnecting to form the longitudinal channels in the device.

Figure 2A:
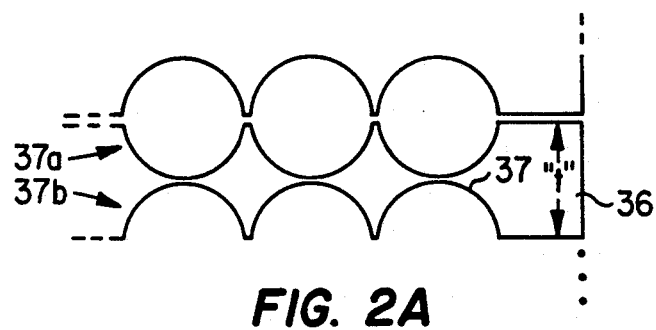
FIG. 2A is a detailed front view of a portion of the composite first end surface of the image transfer device of FIG. 2 showing the sets of closed tapered channels therein in substantially abutting relation to form a "matrix" end.

Because of the "tapered" structure of the modular spacers, the end 37 of the transfer elements along the first end surface 36 are in substantially abutting relation as best seen in FIG. 2A. Moreover, each end 37 covers substantially one-half of the thickness "t" of the first end surface 36 such that when the spacers are joined, the sets 37a and 37b of channels are also in substantially abutting relation to form a "matrix." This structure advantageously insures that substantially all of the information in the image applied to the device is transferred without loss between the first end surface 39 and the second end surface 40 (or between such other surfaces as the closed channels may be formed).

With reference now to FIG. 3, a perspective view is shown of an alternate embodiment of the transfer device 26 of FIG. 2 wherein the transfer elements are formed between a second side surface 61 and the second end surface 40. In this embodiment, the transfer elements are also "active" rather than "passive". In particular, active elements are formed by sealing a gas other than air in the closed channels 36 to act as a transfer medium. To seal the gas, a cover element 46 is secured within each opening along the second end surface 40 of the device 26 and coated with a phosphor or like luminiferous material. A filament 64 is embedded in each opening along the second side surface 61. Energization of an filament 64 causes the corresponding phosphor element to glow and thereby illuminate the picture element. Preferably, the modular spacer is formed of a magnetic material to increase the ability of each transfer element to accurately direct the signal to the luminiferous cover element 46.

Figure 4:
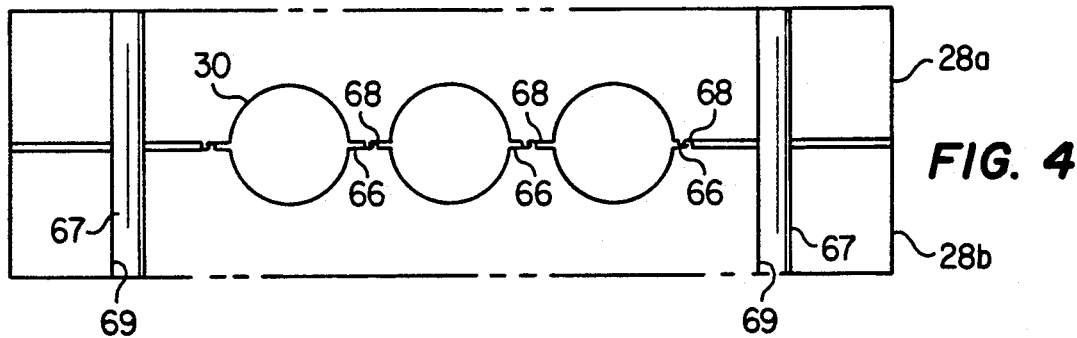
FIG. 4 is a detailed front view along lines 4—4' of FIG. 2 showing a technique for securing first and second modular spacers in a confronting relationship to produce closed channels.

Referring now to FIG. 4, a detailed front view along line 4—4' of FIG. 3 is shown of one mechanism for interlocking corresponding pairs of modular spacers 28 in a confronting relationship to create the plurality of rigidly aligned closed tapered channels 36. As seen in FIG. 4, each of the grooves 30 of member 28a has a raised lip 66 at one edge thereof. Each raised lip 66 engages a raised lip 68 of each corresponding groove in the member 28b mated thereto. This interlocking arrangement is advantageous in that it insures that the spacing between the channels is properly and continuously fixed, thereby substantially reducing or eliminating alignment errors on the display. Moreover, the "interlocked" members prevent cross-talk (or leakage of light) between the transfer elements of the device, thereby preventing "smearing" or other image distortion. Although the symmetrical mating lip structure of FIG. 4 is preferred, interlocking of the modular spacers may be carried out using other mechanical arrangements e.g. a tongue and groove structure. To further stabilize the mated structure of modular spacers, pins 67 are placed in interference holes 69 selectively placed in the spacers.

Figure 5:
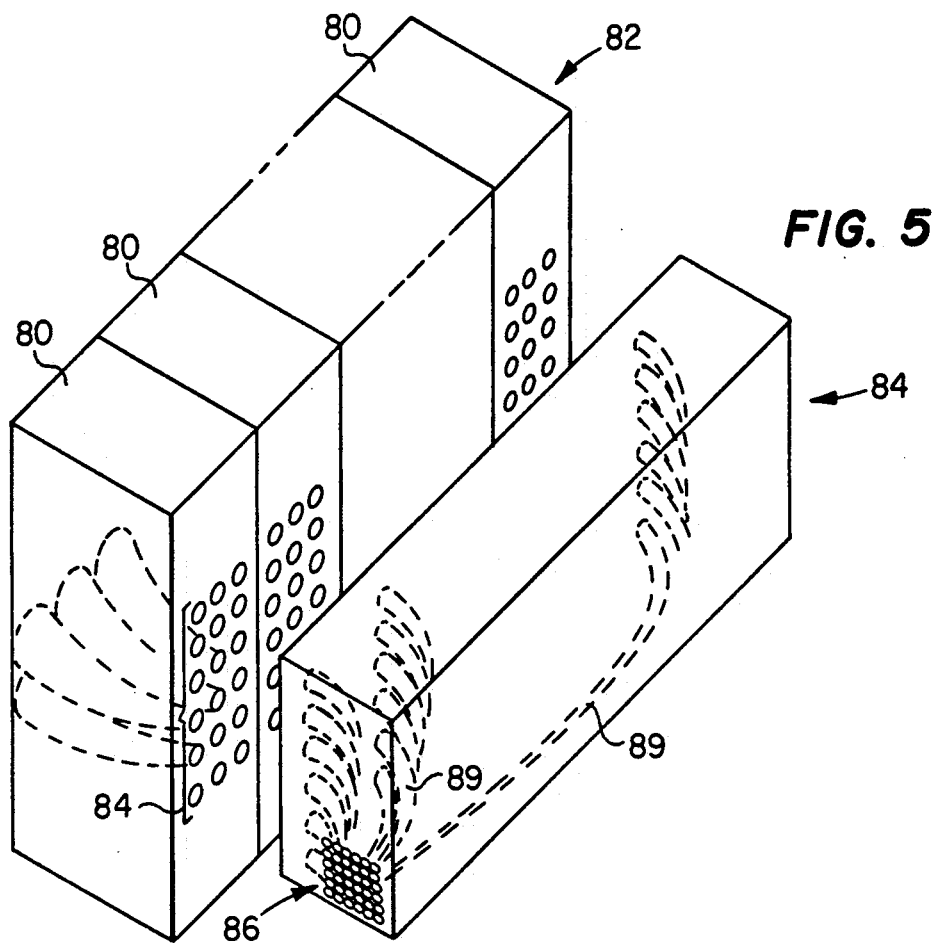
FIG. 5 is a perspective view, partially exploded, of first and second image transfer devices connected together to produce an alternate form of the invention.

Each transfer element or waveguide of the image transfer devices described above in FIGS. 1-4 conducts an elemental portion of an image (comprising a plurality of such portions) between a first surface (e.g., one of the end surfaces or side surfaces) and a second surface. Such devices produce a magnification or reduction of the applied image. In an alternate embodiment as seen in FIG. 5, it is desirable to form the modular spacers 80 of a transfer device 82 without a "tapered" shape. In this embodiment, a plurality of spaced sets 84 of closed channels are thus formed when the modular spacers 80 are joined together in the manner previously described. To prevent information loss, a transfer device 84 is connected to the transfer device 82, with the output of the transfer device 84 forming the input to the transfer device 82 substantially as shown in FIG. 5. The closed channels 89 of the transfer device 84 are then brought together along the input end 86 thereof to receive the image. Of course, the closed channels 89 of the transfer device can be brought together into an input or "matrix" along other faces of the device.

The present invention therefore advantageously provides an improved image transfer device which operates as a "passive" image magnifier. This device has wide applicability for use as a display or as a scanner head for a facsimile device or the like. As previously described, the device is formed of a plurality of interconnected modular spacers, each of which may include a variety of active or passive transfer elements or "waveguides". Moreover, the design of the individual transfer elements allows elemental signal portions to be directed to precise locations on an output without the need to align and specifically locate independently bundles of discrete optical fibers as in prior art image transfer devices.

Figure 6:
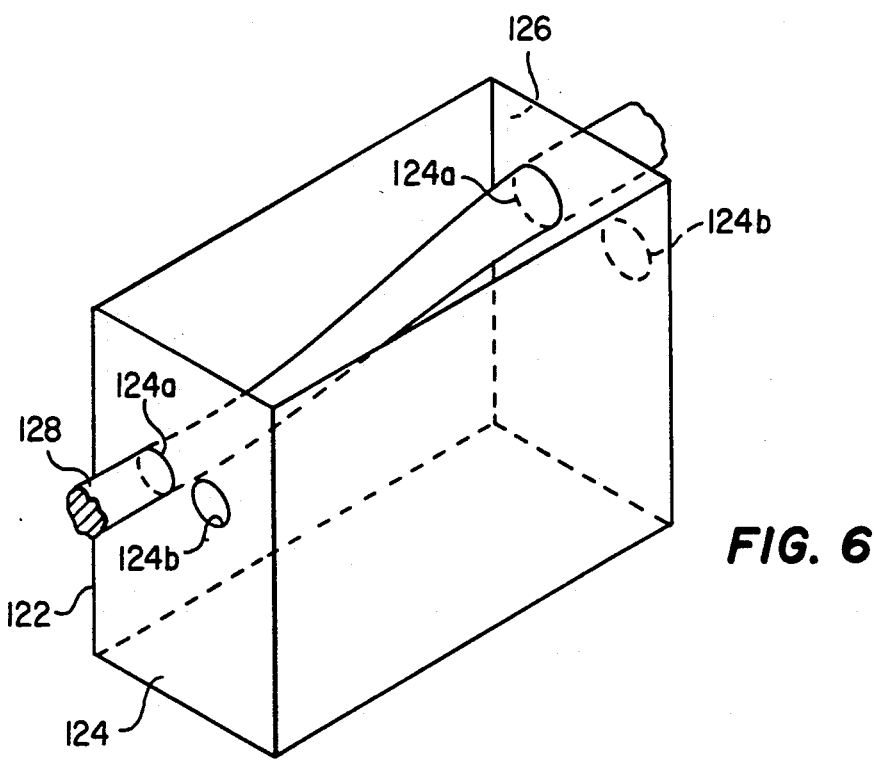
FIG. 6 is a perspective view of a manufacturing apparatus for use in forming an integral image transfer device according to yet another embodiment of the invention.

In yet another embodiment of the invention shown in FIG. 6, an image transfer device is formed as an integral structure, rather than using a plurality of tapered or un-tapered modular spacers. As seen in FIG. 6, metal support 122 is provided with sets of holes along first and second surfaces 124 and 126 thereof. Each pair of holes, such as pair 124a and 126a, support a conical shaped or "tapered" fiber-like element or tube 128 that defines the desired path of a transfer element in the device. When the plurality of tubes are supported within the metal support 122, a suitable plastic material 30 is poured or injected therein and thereafter hardened. The tubes 128 are then retracted from the metal support at their larger ends. The resulting channels are filled with a suitable light conductive material having an index of refraction different than the index of refraction of the material 130. An image transfer device formed in the manner is suitable for transferring images between the input and output ends of the device as heretofore described.

Although the invention has been described in detail, the same is by way of illustration and example only and is not to be taken by way of limitation, the spirit and scope thereof being limited to the terms of the appended claims.

I claim:

1. An image transfer device, comprising:
    at least first and second pre-molded spacers each having first and second opposed longitudinal surfaces and first and second opposed end surfaces, with at least one of the opposed longitudinal surfaces of each spacer provided with a plurality of elongated grooves etched therein with the grooves being in substantially abutting relation along the first end surface and laterally displaced from one another and terminating along the second end surface, and wherein the second end surface of each spacer has a predetermined thickness greater than the thickness of the first end surface;
    means for interconnecting the first and second spacers in back-to-back confronting relationship such that the etched grooves of the first and second spacers cooperate to form a set of closed channels through the interconnected first and second pre-molded spacers; and
    means located within each of the closed channels for conducting elemental image portions of an image through the closed channels between the first and second end surfaces, wherein the means for conducting includes a conducting material along an inner peripheral surface of each of the closed channels.

2. The image transfer device as described in claim 1 wherein the means for interconnecting includes a raised lip adjacent an edge of each groove in the first and second spacers.

3. The image transfer device as described in claim 2 wherein each of the first and second spacers includes one or more positioning holes therein and the means for interconnecting includes one or more pins designed to cooperate with the one or more positioning holes, respectively, to secure the first and second spacers.

4. The image transfer device as described in claim 1 wherein the conducting material has an index of refraction different than the index of refraction of the spacers.

5. The image transfer device as described in claim 1 wherein the plurality of grooves in each of the first and second spacers are tapered and are formed in a side-by-side relationship along the first and second longitudinal surfaces between the first and second end surfaces.

6. An image transfer device, comprising:
    at least first and second pre-molded spacers each having first and second opposed longitudinal surfaces and first and second opposed end surfaces, with at least one of the opposed longitudinal surfaces of each spacer provided with a plurality of elongated grooves etched therein with the grooves being in substantially abutting relation along the first end surface and laterally displaced from one another and terminating along the second end surface, and wherein the second end surface of each spacer has a predetermined thickness greater than the thickness of the first end surface;
    means for interconnecting the first and second spacers in back-to-back confronting relationship such that the etched grooves of the first and second spacers cooperate to form a set of closed channels through the interconnected first and second pre-molded spacers; and
    means located within each of the closed channels for conducting elemental image portions of an image through the closed channels between the first and second end surfaces, wherein the means for conducting includes:
    a gas substantially filling each of the closed channels;
    means located along the first and second end surfaces for sealing the gas within each of the closed channels;
    a filament located in each of the closed channels along the first end surface, wherein energization of the filaments illuminates selective portions of the second end surface.

7. A method for making an optical display apparatus, comprising the steps of:
    (a) supporting a pattern of elongated fiber-like elements in a deformable plastic body of low index of refraction material in a manner such that the elements are spaced apart throughout their length and are closer together at a first side of the plastic body than at a second side of the plastic body and wherein each element has a tapered cross-section that increases from the first side to the second side;
    (b) molding said deformable plastic body into a unitary structural assembly embodying the pattern and wherein the fiber-like elements remain removable from the molded plastic body;
    (c) removing the fiber-like elements from the molded plastic body to create a pattern of tapered grooves therein: and (d) introducing light conducting material of a higher index of refraction than said body material into the tapered grooves to thereby form the optical display apparatus, wherein when energized with visible light the apparatus conducts an image from the first side to the second side.

8. A method for making an optical display apparatus, comprising the steps of:
 (a) supporting a pattern of elongated fiber-like elements in a deformable plastic spacer of low index of refraction material in a manner such that the elements are spaced apart throughout their length and are closer together at a first side of the plastic spacer than at a second side of the plastic spacer and wherein each element has a tapered cross-section that increases from the first side to the second side;
 (b) molding said deformable plastic spacer into a unitary structural assembly embodying the pattern and wherein the fiber-like elements remain removable from the molded plastic spacer;
 (c) removing the fiber-like elements from the molded plastic spacer to create a pattern of tapered grooves therein; and
 (d) repeating steps (a)–(c) to produce another molded plastic spacer;
 (e) supporting the molded plastic spacers in a back-to-back relationship with the tapered grooves of one of the spacers being transversely aligned with the tapered grooves of the other spacer to thereby create a body having a plurality of closed channels formed by the aligned tapered grooves; and
 (f) introducing light conducting material of a higher index of refraction than said body material into the closed channels to thereby form the optical display apparatus, wherein when energized with visible light the apparatus conducts an image from the first side to the second side.

* * * * *